United States Patent Office 3,316,239
Patented Apr. 25, 1967

3,316,239
WATER-SOLUBLE ORGANIC DYESTUFFS
Henri Riat, Arlesheim, and Karl Seitz, Neuallschwil, Switzerland, assignors to Ciba Limited, Basel, Switzerland, a Swiss company
No Drawing. Filed Oct. 24, 1963, Ser. No. 318,528
Claims priority, application Switzerland, Mar. 6, 1957, 43,522/57; May 23, 1957, 46,433/57
17 Claims. (Cl. 260—163)

The present application is a continuation-in-part of copending application Ser. No. 718,435, filed Mar. 3, 1958 (abandoned since the filing of the present application).

This invention provides valuable new water-soluble organic dyestuffs which contain, in addition to at least one and preferably more than one group imparting solubility in water, the radical of an $\alpha:\beta$-unsaturated aliphatic carboxylic acid containing 3 carbon atoms and bound through the —CO group.

Suitable radicals of $\alpha:\beta$-unsaturated carboxylic acids containing 3 carbon atoms are above all those which contain a single double bond, such as the radical of acrylic acid of the formula $$CH_2=CH-CO-$$

and radicals of acrylic acids containing in $\alpha$- or $\beta$-position a negative substituent, for example, a halogen atom. Alternatively, radicals containing a triple bond are suitable, such as the radical of propiolic acid of the formula $$HC\equiv C-CO-$$

These radicals may be bound through their —CO group to an aromatic nucleus of the dyestuff molecule, preferably through a nitrogen atom. This nitrogen atom may contain as a substituent an aliphatic, cycloaliphatic, araliphatic or aromatic radical. Expecially valuable are those dyestuffs which contain at least one group of the formula
(1)

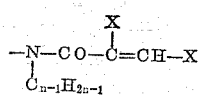

in which $n$ is a whole number, preferably 1, and one X represents a hydrogen atom and the other X a chlorine or hydrogen atom.

In addition to a group of this type, which may be connected to an aromatic ring of the dyestuff molecule through an alkylene radical, but is preferably so connected directly, the dyestuffs of the invention contain at least one group imparting solubility in water, for example, a sulfonic acid amide group which may be acylated, a methylsulfone group or one or preferably more than one ionised strongly acid group imparting solubility in water, such as a carboxyl or sulfonic acid group. They may also contain further substituents, especially those not imparting solubility in water, such as halogen atoms or nitro, acylamino, alkyl or alkoxy groups.

The groups imparting solubility in water and the radical of an $\alpha:\beta$-unsaturated carboxylic acid may be distributed in the dyestuff molecule in any manner, that is to say, that one such group and one such radical may be present in the same dyestuff component or one component may contain, for example, the solubilising group and another component the $\alpha:\beta$-unsaturated acyl group, for example, a group of Formula 1.

The dyestuffs of this invention can be made from dyestuff components of which at least one already contains one of the aforesaid $\alpha:\beta$-unsaturated substituents. Such dyestuff components can be made by methods in themselves known, for example, by the acylation of suitable compounds with halides or anhydrides of aliphatic carboxylic acids whose aliphatic chain contains a double bond or a triple bond in $\alpha:\beta$-position to the —CO group.

Compounds suitable for this purpose are, for example, monamines containing in addition to the amino group to be acylated a substituent convertible into a diazotizable amino group, or diamines which are monoacylated. For this monoacylation there are especially suitable aromatic diamines that contain in ortho-position to an amino group a negative substituent, for example, a sulfonic acid group, a carboxylic acid group or a chlorine atom. As coupling components there may be mentioned compounds that contain, in addition to an amino group or hydroxyl group whose presence makes coupling possible, a ketomethylene group, an acylatable amino group or a substituent convertible into such an amino group after the coupling reaction.

Instead of introducing the aforesaid $\alpha:\beta$-unsaturated radicals into the dyestuff components prior to the production of the dyestuff, they may be introduced into preformed dyestuffs. Thus, for example, the acylation of dyestuffs that contain an acylatable amino group, above all an —NH$_2$ group, for example, with propiolic acid chloride or anhydride, yields valuable dyestuffs containing an $\alpha:\beta$-unsaturated carboxylic acid radical.

Among the organic compounds suitable for making reactive dyestuffs there may be mentioned for example, 1,3- or 1,4-diaminobenzene-sulfonic acid or -carboxylic acid, 4,4'-diamino-1,1'-diphenyl-3-sulfonic acid, 1-(3'- or 4'-amino)-phenyl-3-methyl-5-pyrazolone, amino-hydroxynaphthalenes and, preferably, sulfonic acids thereof, for example, 2-amino-5-hydroxy-naphthalene-7-sulfonic acid, 2-amino-8-hydroxynaphthalene-6-sulfonic acid, 1-amino-8-hydroxy-naphthalene-4,6-disulfonic acid, 1-amino-8-hydroxynaphthalene-3,6-disulfonic acid.

Some water-soluble dyestuff systems typical of this invention are listed below without, however, limiting it. In selecting starting dyestuffs or the diazo components and/or coupling components, care should be taken to see that these products contain a sufficient number of substituents imparting solubility in water, such as sulfonic and/or carboxylic acid groups:

I

Azo dyestuffs, e.g. dyestuffs corresponding to the general formula

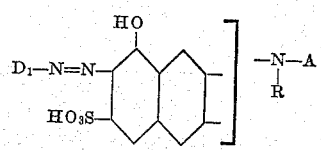

in which A represents a propiolyl, chloroacrylyl or acrylyl radical, R represents a hydrogen atom or an alkyl radical of low molecular weight and $D_1$ represents the radical of a diazo component which contains at least one acid group imparting solubility in water and may contain azo groups.

The diazo components in which the radicals $D_1$ have the formula

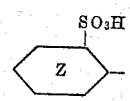

are particularly interesting; the benzene ring Z may carry still other substituents, for example

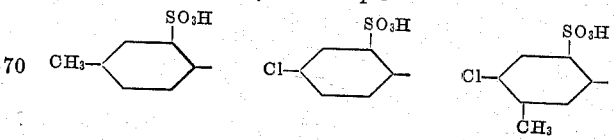

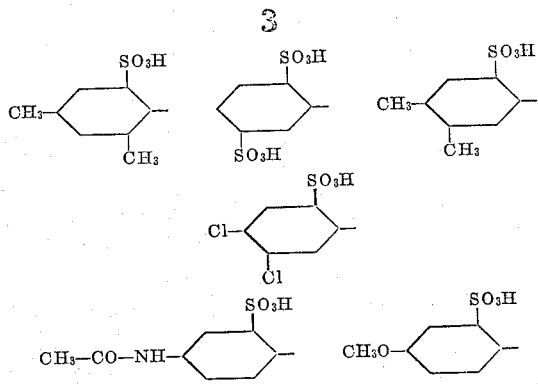

The following radicals of the diazo components also enter into consideration:

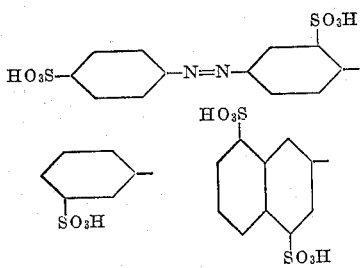

Dyestuffs of the general formula

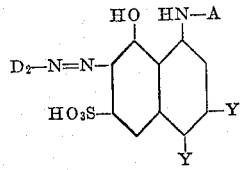

in which A has the meaning given above, one Y represents a hydrogen atom and the other a sulfonic acid group, and wherein $D_2$ represents the radical of a diazo component which may carry azo groups and groups imparting solubility in water, for example

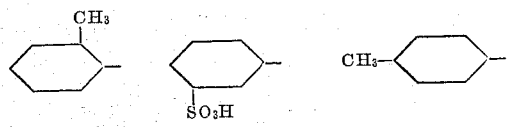

The diazo components the radicals of which have the formula

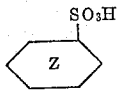

are particularly interesting; the benzene ring Z may carry still other substituents, for example

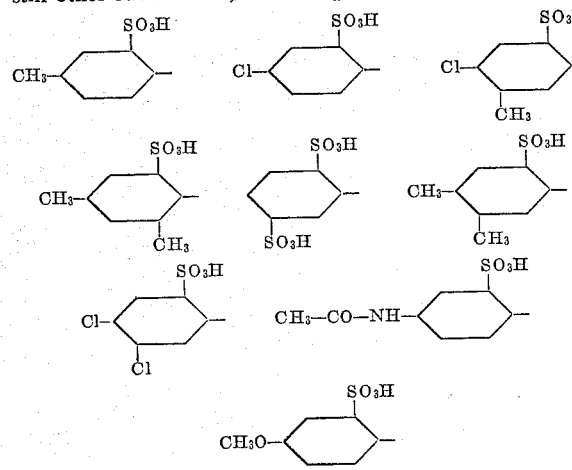

Dyestuffs of the general formula

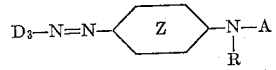

in which A and R have the meanings given above and $D_3$ represents the radical of a diazo component containing at least one acid group imparting solubility in water and, optionally, other substituents, such as azo groups, in particular the radicals

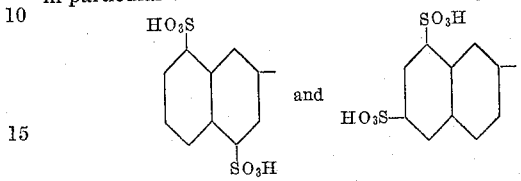

and in which the benzene ring Z may carry other substituents, e.g.

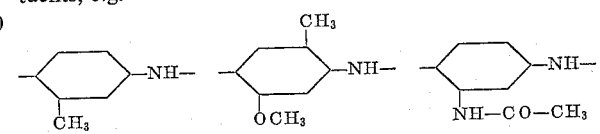

Monoazo dyestuffs containing at least two acid groups imparting solubility in water and corresponding to the general formula

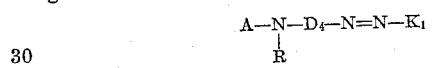

in which A and R have the meanings given above, and $D_4$ represents the radical of a diazo component, such for example, as

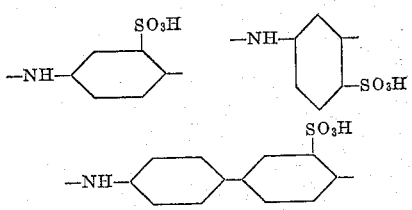

and in which $K_1$ represents the radical of a hydroxy-naphthalene-sulfonic acid that may contain other substituents, such for example as

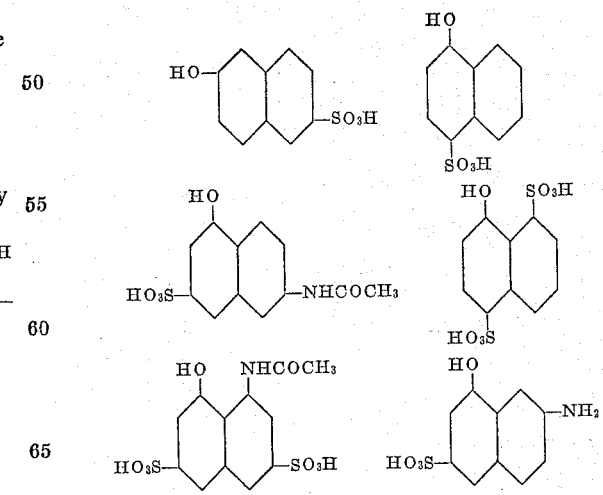

and a ketomethylene compound, such as, for example

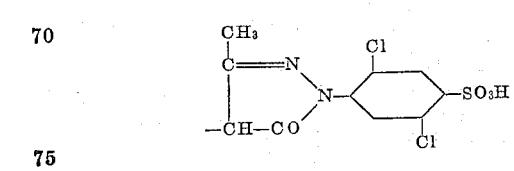

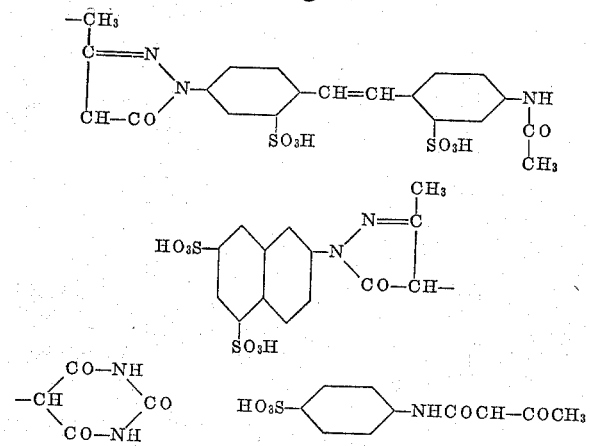

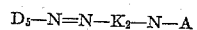

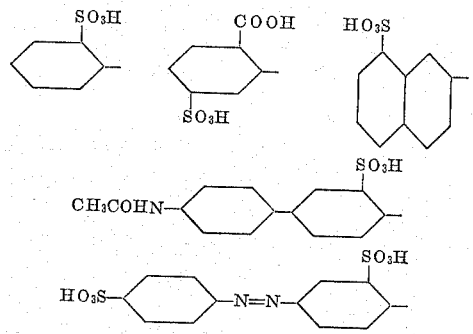

Dyestuffs of the general formula $$D_5-N=N-K_2-N-A$$
$$\qquad\qquad\qquad\; |$$
$$\qquad\qquad\qquad\; R$$

in which A and R have the meanings given above, and $D_5$ represents the radical of a diazo component containing at least one sulfonic acid group and, optionally, an amino group, as for example

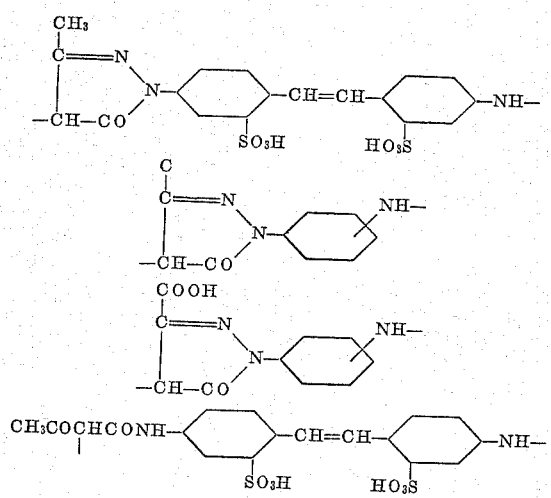

and in which $K_2$ represents the radical of a coupling component in a position vicinal to an enolizable keto group, such as for example Metal complex compounds of monoazo dyestuffs with at least two acid groups imparting solubility in water and at least one radical of the Formula I, linked by an azo bridge. The metal atoms entering into consideration are those of chromium, cobalt, nickel, and above all, of copper.

The diazo components that may participate in the formation of such dyestuffs are, inter alia, the 2-amino-1-hydroxybenzenes, the 2-amino-1-hydroxy- and 1-amino-2-hydroxynaphthalenes and the 2-amino-benzene-1-carboxylic acids, whereas the coupling components that can be used are, e.g. the 1-(amino-aryl)-5-pyrazolones and the amino-hydroxynaphthalene-sulfonic acids.

The radical A may be linked to the coupling component, for example in the following manner:

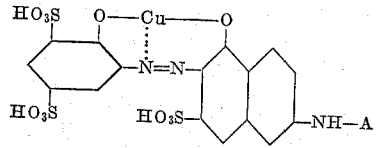

or to the diazo component, for example

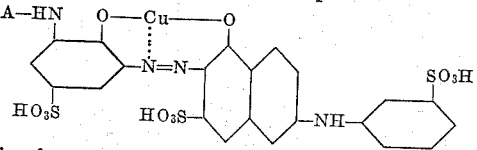

It is of course possible to make not only 1:1, but also 1:2 metal complexes. The latter contain preferably chromium or cobalt as metal atoms.

II

Anthraquinone dyestuffs, e.g. 1-amino-4-(3'- or 4'-aminophenylamino)-anthraquinone-2-sulfonic acid, 1-amino-4-(4'-aminophenylamino)-anthraquinone-2'- or 3'-sulfonic acid, 1-amino-4-(4'-aminophenylamino)-anthraquinone-2:2'- or 2:3'-disulfonic acid, 1-amino-4-(3'-aminophenylamino)-anthraquinone-2:4'-disulfonic acid, 1-amino-4-(4'-aminophenylamino)-anthraquinone - 2:3': 5-, 2:3':6-, 2:3':7- or 2:3':8-trisulfonic acid, 1-amino-4-(4'-aminophenylamino) - anthraquinone-2:2':5-trisulfonic acid, 1-amino-4-(3'-aminophenylamino)-anthraquinone-2:2':8-trisulfonic acid, furthermore 1:5-dihydroxy-4:8-diaminoanthraquinone-2:6-disulfonic acid, 1:4- or 1:5-diaminoanthraquinone-2-sulfonic acid, 4-, 5- or 8-amino-1-acylaminoanthraquinones (obtainable by acylating 1-aminoanthraquinones containing a nitro group in the 4-, 5- or 8-position, with a sulfo- or disulfo-benzoic acid halide and subsequently reducing the nitro group to an amino group), aminodibenzanthrone sulfonic acids and amino-isodibenzanthrone sulfonic acids (obtainable by introducing two sulfonic acid groups into aminodibenzanthrone or into amino-isodibenzanthrone). Furthermore, for example, by the partial amidation of 1 molecular proportion of a tri- or tetra-sulfonic acid chloride of a colored anthraquinone derivative or 1 molecular proportion of a pthalocyanine tri- or tetra-sulfonic acid chloride with 1 molecular proportion of a diamine, for example, with 1 molecular proportion of a diamino-benzene-sulfonic acid or a monoacyl-derivative of such acid, there are obtained very valuable dyestuffs suitable for use as starting materials in the process, which dyestuffs contain, after hydrolysing the unreacted sulfonic acid chloride groups and the acylamino group, if present, an acylatable amino group, which can be acylated according to the invention with acrylic acid chloride or anhydride.

These anthraquinone dyestuffs may have, e.g. the formula

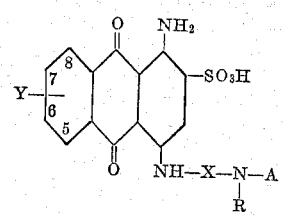

in which A and R have the meanings given above, X represents a bridge that may carry groups imparting solubility in water, for example

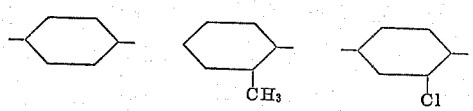

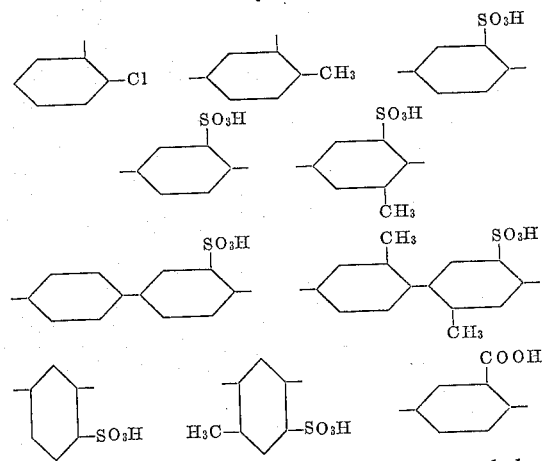

and wherein Y represents a hydrogen atom, a halogen atom or a sulfonic acid group, the halogen atom occupying position 6 or 7, and the sulfonic acid group one of the positions 5, 6, 7 and 8.

III.—PHTHALOCYANINE DYESTUFFS

Dyestuffs on the basis of aminophthalocyanine that are capable of condensing with a reactive compound of this invention are, for example, products of the general formula

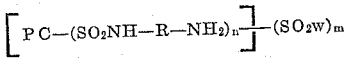

In this latter, PC represents the radical of a phthalocyanine and R is a divalent aliphatic, cycloaliphatic or aromatic radical, whereas $n$ stands for 1, 2 or 3, and $m$ for 1, 2 or 3, and $w$ represents —OH or —NH$_2$.

Aminophthalocyanine dyestuffs are obtained in known manner by reaction of the phthalocyanines containing sulfonic acid-chloride groups in positions 3 and 4 of the benzene nuclei with suitable aliphatic, cycloaliphatic or aromatic diamines, or with monoamines containing a substituent convertible into an amino group. In this manner mixtures are usually obtained that contain various condensation products.

As further soluble organic dyestuffs, which can be used in this invention, there may be mentioned stilbene dyestuffs, nitro dyestuffs, oxazine dyestuffs, thioxanthone dyestuffs, etc.

The acylation of the compounds used as dyestuff components, for example, as diazo- or coupling components, and of the dyestuffs containing an acylatable amino group, is advantageously carried out in the presence of an acid-binding agent such as sodium acetate, sodium hydroxide or sodium carbonate, and under relatively mild conditions, for example, in an organic solvent, or at a relatively low temperature in an aqueous medium.

The dyestuffs of this invention are suitable for dyeing or printing a very wide variety of materials, but because of their reactivity more especially for polyhydroxylated fibrous materials such as cellulosic materials, which may be either synthetic fibers, for example, linen and above all cotton. They are suitable for dyeing by the so-called direct dyeing method and also for printing or for dyeing by the foularding method. The dyestuffs can be fixed on the material to be dyed by treatment with alkalies and heat, for example, with steam.

Because of their stability toward alkalies they are not destroyed during the aforementioned fixation, even if they are applied e.g. by the so-called thermofixation method, wherein the impregnation liquor contains the dyestuff and the alkali in a single bath.

To improve the properties of wet fastness, it is advisable to subject the dyeings and prints obtained in this manner to thorough rinsing in cold and hot water, if desired, in the presence of a dispersing agent or an agent that promotes the diffusion of any non-fixed dyestuff.

As a rule the dyeings obtained with the dyestuffs of the invention on cellulosic fibers are distinguished by the purity of their tints, by their good fastness to light and above all by excellent fastness to washing.

The dyestuffs of the invention are also suitable for dyeing and printing nitrogenous materials, such as leather, silk and above all wool, and also superpolyamide and superpolyurethane fibers, from a weakly alkaline, neutral or acid bath, for example, an acetic acid bath.

The dyeings produced with such dyestuffs on wool have an excellent fastness to washing and fulling.

The following examples illustrate the invention, the parts and percentages are by weight unless otherwise indicated. While the following examples are directed to nitro, monoazo, disazo, trisazo, phthalocyanine, anthraquinone, oxazine and thioxanthone dyes—because these, and especially the dyes of the azo and anthraquinone categories, typify more than two-thirds of the known dyes (cf. e.g. the Color Index)—the invention is not restricted to the thus-exemplified categories, but may equally well be applied to dyes of the other aforementioned categories.

Example 1

10.44 parts of the dyestuff of the formula

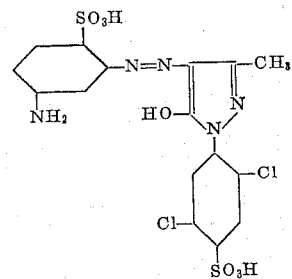

are neutralized in 350 parts of water with sodium carbonate and 6.56 parts of anhydrous sodium acetate are added. While stirring vigorously, a solution of 3.6 parts of acrylic acid chloride in 25 parts of acetone is added dropwise at 0 to 5° C. in the course of 10 minutes. After ½ hour the reaction mixture is adjusted to pH=9 with sodium carbonate, and the new dyestuff formed is salted out with 100 parts of sodium chloride and filtered off.

The dyestuff dyes cotton greenish yellow tints by the process described in Example 16. By the process described in Example 18 this dyestuff produced also on wool greenish yellow tints of very good fastness to washing.

When acrylic acid chloride is replaced by 5 parts of α-chloracrylic acid chloride for the acylation of the above dyestuff, a product results which likewise dyes wool and cotton fast greenish yellow tints.

Example 2

8.76 parts of the dyestuff of the formula

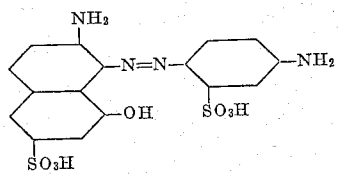

are neutralized in 300 parts of water with sodium carbonate and 6.56 parts of anhydrous sodium acetate are added. While stirring vigorously, a solution of 5 parts of α-chloracrylic acid chloride in 25 parts of toluene is added dropwise at 0 to 5° C. in the course of 10 minutes. After a short time the reactive amino group has been completely acylated. The solution is adjusted to pH=9 with sodium carbonate, and the dyestuff is salted out with 70 parts of sodium chloride and filtered off.

The dyestuff obtained in this manner dyes cotton and wool bluish red tints.

When the acylation of the above dyestuff is performed with 3.6 parts of acrylic acid chloride instead of with α-chloracrylic acid chloride, a product is obtained that dyes wool by the method according to Example 18 and cotton by the method according to Example 15 bluish red tints.

*Example 3*

10.44 parts of the dyestuff of the formula

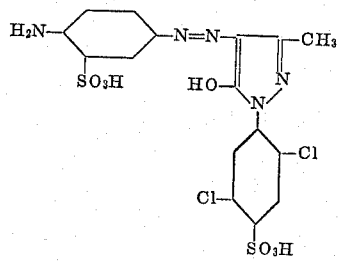

are neutralized in 350 parts of water with sodium carbonate, and 6.56 parts of anhydrous sodium acetate are added. While stirring vigorously, 3.78 parts of acrylic acid anhydride are added. On completion of the acylation the reaction mixture is adjusted to pH=9 by means of sodium carbonate. The dyestuff is salted out with 100 parts of sodium chloride and filtered off.

The product thus obtained dyes wool and cotton yellow tints.

*Example 4*

5.18 parts of the dyestuff of the formula

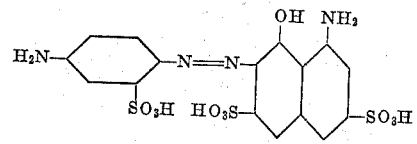

are neutralized in 300 parts of water with sodium carbonate. At 0 to 5° C. a solution of 10 parts of acrylic acid chloride in 25 parts of acetone is added to the ice-cold dyestuff solution and at the same time the pH value of the solution is maintained between 7 and 8 by the dropwise addition of an aqueous sodium carbonate solution. When the acylation of the two amino groups is complete, the dyestuff is isolated with 100 parts of sodium chloride at a pH value of 9.

The dyestuff dyes wool and cotton reddish violet tints.

By acylating the amino dyestuffs listed in column I with acrylic acid chloride according to Example 1, further dyestuffs are obtained that dye cotton and wool the tints listed in column II.

| | I | II |
|---|---|---|
| 1 | | Reddish yellow. |
| 2 | | Do. |
| 3 | | Do. |
| 4 | | Yellow. |
| 5 | | Greenish yellow. |
| 6 | | Do. |

| | I | II |
|---|---|---|
| 7 | structure with SO₃H, NH₂ on benzene, N=N to pyrazolone with COOH, HO, NH | Greenish yellow. |
| 8 | structure with SO₃H, NH₂ on benzene, N=N to pyrazole with CH₃, HO, N-phenyl-SO₃H | Do. |
| 9 | structure with SO₃H, NH₂ on benzene, N=N to pyrazole with CH₃, HO, N-phenyl (Cl, SO₃H) | Do. |
| 10 | structure with H₂N, SO₃H on benzene, N=N to pyrazole with CH₃, HO, N-phenyl (Cl, SO₃H) | Yellow. |
| 11 | HO₃S-naphthalene(SO₃H)-N=N-naphthalene(OH, SO₃H, NH₂) | Reddish orange. |
| 12 | HO₃S-C₆H₄-N=N-C₆H₃(SO₃H)-N=N-naphthalene(OH, SO₃H, NH₂) | Scarlet. |
| 13 | HO₃S-C₆H₄-N=N-C₆H₃(SO₃H)-N=N-C₆H₃(NHCOCH₃, NH₂) | Yellowish orange. |
| 14 | naphthalene(SO₃H, SO₃H)-N=N-C₆H₃(CH₃)-N=N-C₆H₃(CH₃, NH₂) | Brown-orange. |
| 15 | C₆H₃(SO₃H)-N=N-naphthalene(SO₃H)-N=N-C₆H₄-NH₂ | Do. |

| | I | II |
|---|---|---|
| 16 | (structure with SO₃H groups, -N=N-, -NH₂) | Brown. |
| 17 | (structure with HO₃S, SO₃H, -CH=CH-, -N=N-, OCH₃, CH₃, -NH₂) | Yellow. |
| 18 | (structure HO₃S- with NO₂, -NH-, -NH₂) | Yellowish brown. |
| 19 | m-Amino-p-sulfo-monophenylamide of copper phthalocyanine-3,3′,3″,3‴-tetrasulfonic acid | Turquoise Blue. |
| 20 | HO₃S- (structure with -N=N-, -N=N-, -CH=CH-, SO₃H, SO₃H, -N=N-, -NH₂) | Brown orange. |

The 3-acrylylamino-1-aminobenzene required for the preparation of the dyestuff No. 2 above can be made by acylating meta-nitraniline with acrylic acid chloride, for example in an organic solvent such as benzene or chlorobenzene and reducing the resulting 3-acrylylamino-1-nitrobenzene with iron and acetic acid.

*Example 5*

53.0 parts of the dyestuff of the formula

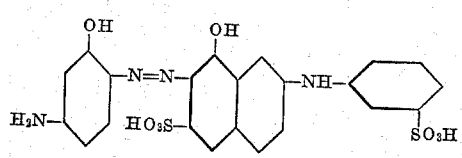

are neutralized in 750 parts of water with sodium carbonate. 12 parts by volume of 10 N-sodium hydroxide solution and 120 parts by volume of a sodium chromesalicylate solution containing in 100 parts by volume 2.8 parts of chromium are added, and the mixture is refluxed for 3 hours. The solution of the 1:2-chromium complex formed is allowed to cool, neutralized with hydrochloric acid and made up with water to a volume of 1000 parts.

200 parts of the above solution are cooled to 0–5° C. and 6.56 parts of anhydrous sodium acetate are added. While stirring vigorously, a solution of 3.6 parts of acrylic acid chloride in 25 parts of acetone is added dropwise at the same temperature in the course of 10 minutes. After ½ hour the solution is adjusted with sodium carbonate to pH=9, and the dyestuff is salted out with 100 parts of sodium chloride and filtered off.

The dyestuff dyes cotton reddish grey tints.

The parent dye of the above formula can be prepared, for example, by coupling diazotized 5-nitro-2-aminophenol with 2-phenylamino-8-hydroxynaphthalene-3′:6-disulfonic acid and reducing the nitro group of the dyestuff so formed to an amino group by means of sodium hydrosulfide.

*Example 6*

43.9 parts of the dyestuff of the formula

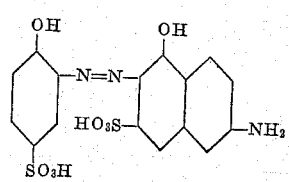

are neutralized in 500 parts of water with sodium carbonate. 12 parts by volume of 10 N-sodium hydroxide solution and 310 parts by volume of a cobalt sulfate solution of 5% strength are added, and the whole is heated for ½ hour at 75 to 80° C. The solution of the 1:2-cobalt complex formed is allowed to cool, adjusted to pH=7, and made up with water to a volume of 1500 parts.

300 parts of the above solution are treated with 6.56 parts of anhydrous sodium acetate and cooled to 0–5° C. While stirring vigorously, a solution of 3.6 parts of acrylic acid chloride is added dropwise at this temperature in the course of 10 minutes. After ½ hour the solution is adjusted with sodium carbonate to pH=9, and the dyestuff is salted out with 100 parts of sodium chloride and filtered off.

The dyestuff dyes cotton violet tints.

By acylating the metalliferous azo dyes listed in column I with acrylic acid chloride as described in Examples 5 and 6, dyestuffs are obtained that dye cotton the tints listed in column II.

| | I | II |
|---|---|---|
| 1 | Copper complex of the dyestuff of the formula: [structure with OH, OH, N=N, HO₃S, SO₃H, NH₂] | Ruby red. |
| 2 | 1:2-chromium complex of the dyestuff of the formula: [structure with OH, OH, N=N, HO₃S, SO₃H, NH₂] | Bluish violet. |
| 3 | 1:2-chromium complex of the dyestuff of the formula: [structure with H₂N, OH, N=N, OH, SO₃H, NH-phenyl-COOH] | Blue. |
| 4 | 1:2-chromium complex of the dyestuff of the formula: [structure with H₂N, OH, N=N, pyrazole-CH₃, HO, SO₃H, phenyl] | Yellowish red. |
| 5 | 1:2-cobalt complex of the dyestuff of the formula: [structure with H₂N, OH, N=N, pyrazole-CH₃, HO, SO₃H, phenyl] | Yellowish brown. |

Example 7

9.78 parts of the dyestuff of the formula

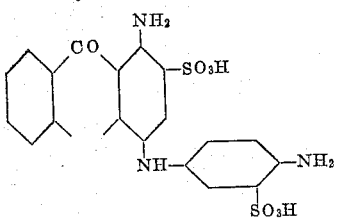

are neutralized in 300 parts of water with sodium hydroxide, and 6.56 parts of anhydrous sodium acetate are added. While stirring vigorously, a solution of 3.6 parts of acrylic acid chloride in 25 parts of acetone is added dropwise at 0 to 5° C. in the course of 10 minutes. After ½ hour the solution is adjusted to pH=9 with sodium carbonate, and the dyestuff is salted out with 100 parts of potassium chloride and filtered off.

The dyestuff dyes wool and cotton greenish blue tints.

A similar dyestuff is obtained when 5 parts of α-chloracrylic acid chloride are used instead of acrylic acid chloride.

By using 9.78 parts of the dyestuff of the formula

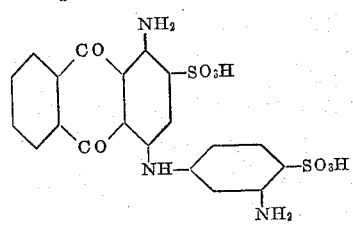

and acylating as described above, a dyestuff is obtained that dyes cotton and wool blue tints.

A greenish blue dyestuff is obtained by acylating the dyestuff of the formula

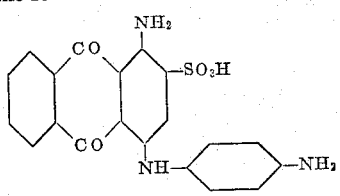

with acrylic acid chloride.

Example 8

By using 7.96 parts of the dyestuff of the formula

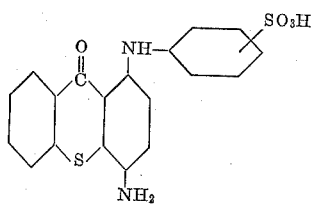

and acylating according to Example 1 with acrylic acid chloride, a dyestuff is obtained that dyes cotton yellow tints.

Example 9

By using 7.27 parts of the dyestuff of the formula

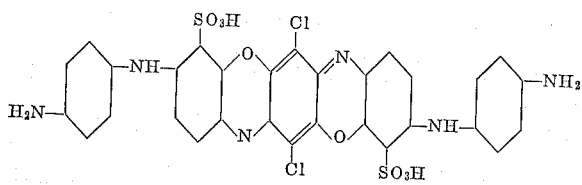

(prepared in known manner and described, for example, in U.S. Patent No. 2,763,641, patented Sept. 18, 1956, by Karl Seitz et al., and acylating the two amino groups with acrylic acid chlorides as described in Example 1, a dyestuff is obtained that dyes cotton greenish grey-blue tints.

Example 10

484 parts of 4-acrylylamino-1-aminobenzene-2-sulfonic acid are pasted in 300 parts of water, 5 parts of hydrochloric acid of 30% strength are added at 0–5° C. and diazotization is performed with 5 parts by volume of 4 N-sodium nitrite solution. The diazo suspension of acid reaction to Congo is then added to an ice-cold solution of 8.46 parts of 1-benzoylamino-8-hydroxynaphthalene-3:6-disulfonic acid and 12 parts of sodium carbonate in 300 parts of water. On completion of the coupling reaction the dyestuff is salted out with 200 parts of sodium chloride.

The dyestuff of the formula

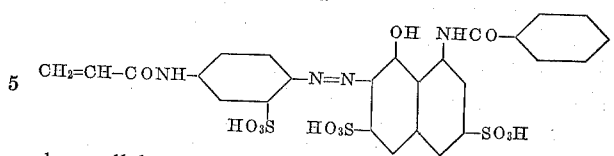

dyes cellulose by the method described in Example 15 reddish violet tints. On wool it produces likewise fast reddish violet tints.

Alternatively, the coupling can be performed with advantage in the presence of sodium acetate or of sodium bicarbonate.

The 4-acrylylamino-1-aminobenzene-2-sulfonic acid used in this example can be prepared thus:

18.8 parts of 1:4-diaminobenzene-2-sulfonic acid are dissolved in 400 parts of water, and 30 parts of anhydrous sodium acetate are added. While stirring vigorously, a solution of 10 parts of acrylic acid chloride in 25 parts of acetone is added dropwise at 0–5° C. in the course of 10 minutes. On completion of the reaction the mixture is acidified with hydrochloric acid, filtered, and the reaction product is washed with saturated sodium chloride solution.

In a similar manner the 5-acrylylamino-1-aminobenzene-2-sulfonic acid can be prepared from 5-amino-1-aminobenzene-2-sulfonic acid.

Example 11

4.78 parts of 2-amino-5-hydroxynaphthalene-7-sulfonic acid are neutralized in 300 parts of water with sodium carbonate and 6.56 parts of anhydrous sodium acetate are added. While stirring vigorously an acetonic solution of 3.6 parts of acrylic acid chloride is run in at 0 to 5° C. After a short time acylation of the amino group is completed.

10 parts of sodium bicarbonate are added to the solution of the resulting 2-acrylylamino-5-hydroxynaphthalene-7-sulfonic acid, and the diazo compound obtained from 3.46 parts of 1-aminobenzene-2-sulfonic acid is added. On completion of the coupling reaction the dyestuff of the formula

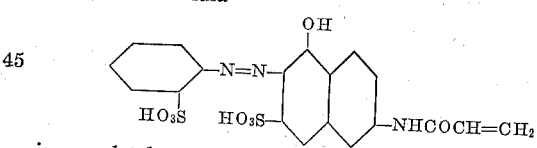

is completely salted out with sodium chloride.

| | I | II | III |
|---|---|---|---|
| 1 | 4-acrylylamino-1-aminobenzene-2-sulfonic acid | Barbituric acid | |
| 2 | do | Acetoaceticorthe-enisidide | Greenish yellow. |
| 3 | do | 1-(2'-chlorophenyl)-3-methyl-5-pyrazolone-5'-sulfonic acid | Do. |
| 4 | do | 2-ureido-5-hydroxynaphthalene-7-sulfonic acid | Yellow. |
| 5 | do | 2-carbethoxyamino-5-hydroxynaphthalene-7-sulfonic acid | Scarlet. Do. |
| 6 | do | ![structure]-NHCOOCH₂CH₂OCH₃ (OH, HO₃S) | Do. |
| 7 | 5-acrylylamino-1-aminobenzene-2-sulfonic acid | 1-acetylamino-8-hydroxynaphthalene-3:6-disulfonic acid | Red. |
| 8 | do | 1-benzoylamino-8-hydroxynaphthalene-3:6-disulfonic acid | Bluish red. |
| 9 | do | 2-ureido-5-hydroxynaphthalene-7-sulfonic acid | Orange. |
| 10 | Aniline | 1-acrylylamino-8-hydroxynaphthalene-3:6-disulfonic acid | Bluish red. |
| 11 | 1-aminobenzene-2-sulfonic acid | do | Do. |
| 12 | 1-aminobenzene-3-sulfonic acid | do | Do. |
| 13 | 2-aminobenzoic acid | do | Do. |
| 14 | Para-aminoacetanilide | do | Violet. |
| 15 | 4-acetylamino-1-aminobenzene-2-sulfonic acid | do | Reddish violet. |
| 16 | 5-acetylamino-1-aminobenzene-2-sulfonic acid | do | Bluish red. |
| 17 | 4-acetylamino-1-aminobenzene-2-sulfonic acid | do | Scarlet. |
| 18 | 1-aminobenzene-2-sulfonic acid | 2-acrylylamino-5-hydroxynaphthalene-7-sulfonic acid | Yellowish red. |
| 19 | 1-aminobenzene-3-sulfonic acid | 2-acrylylamino-8-hydroxynaphthalene-6-sulfonic acid | Do. |
| 20 | 5-acrylylamino-1-aminobenzene-2-sulfonic acid | do | Bluish red. |
| 21 | 4-acrylylamino-1-aminobenzene-2-sulfonic acid | 1-acrylylamino-8-hydroxynaphthalene-3:6-disulfonic acid | Red orange. |
| 22 | do | 2-hydroxynaphthalene-6,8-disulfonic acid | Greenish blue. |
| 23 | do | 1-amino-2-(4'-nitrophenylazo)-8-hydroxynaphthalene-3,6-disulfonic acid. 1-amino-2-[3'-(4''-amino-6''-chloro-5-triazin-2''-ylamino)-phenylazo]-8-hydroxy-3,6,2'-trisulfonic acid. | Blue. |

In addition to the dyestuffs mentioned above the coupling of each of the enumerated diazo components with any of the listed coupling components will result in dyestuffs within the contemplation of the disclosed invention as long as said dyestuffs contain at least one sulfonic acid group and at least one acrylylamino-group.

*Example 12*

48.7 parts of the disazo dyestuff of the formula

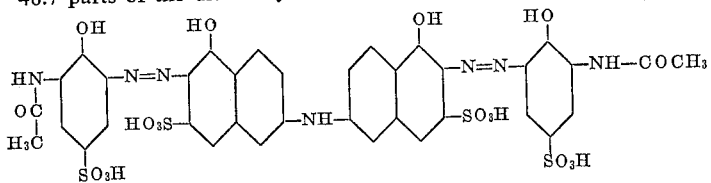

obtained by alkaline coupling of diazotized 1-hydroxy-2-amino-6-acetylaminobenzene-4-sulfonic acid with 5:5'-dihydroxy-2:2'-dinaphthylamino-7:7'-disulfonic acid are heated in 800 parts of sodium hydroxide solution of 4% strength for 1 hour at 90 to 95° C. for the purpose of hydrolysing the acetylamino group. The whole is then neutralized with hydrochloric acid to adjust the pH value to 9, 120 parts of a solution of sodium chromesalicylate containing 2.6% of chromium are added, and the whole is refluxed for 4 hours.

The alkaline solution of the resulting chromium compound containing 1 atom of chromium per two azo groups is adjusted with dilute hydrochloric acid to a pH value of 7 and then cooled to 0–5°C. With vigorous stirring, 20 parts of acrylic acid chloride are added dropwise at this temperature in the course of 10 minutes, while maintaining the reaction mixture at a weakly acid to neutral reaction by gradualy adding sodium hydroxide solution. On completion of the reaction the solution is adjusted with sodium carbonate to pH=9, and the dyestuff is salted out with sodium chloride and filtered off.

It dyes cotton blue tints.

*Example 13*

9.78 parts of the dyestuffs of the formula

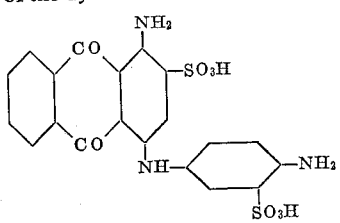

in 300 parts of water are adjusted with sodium hydroxide to pH=7. 6.56 parts of anhydrous sodium acetate are added, and at 0 to 5° C. a solution of 3.54 parts of propiolic acid chloride in 25 parts of acetone is run in within 10 minutes while keeping the whole vigorously stirred. After ½ hour the solution is adjusted with sodium carbonate to pH=9, and the dyestuffs is salted out with 50 parts of potassium chloride and filtered off.

The dyestuff thus obtained dyes cotton blue tints.

*Example 14*

8.76 parts of the dyestuffs of the formula

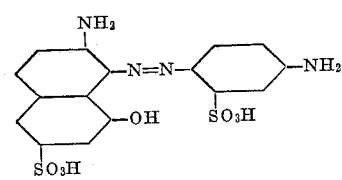

are neutralized in 300 parts of water with sodium carbonate, and 6.56 parts of anhydrous sodium acetate are added.

While stirring vigorously, a solution of 3.54 parts of propiolic acid chloride in 25 parts of acetone is added dropwise at 0–5° C. in the course of 5 minutes. After a short time the reactive amino group is completely acylated. The solution is then adjusted with sodium carbonate to pH=9, and the dyestuffs is salted out with 100 parts of sodium chloride and filtered off.

The dyestuff obtained in this manner dyes cotton bluish red tints.

*Example 15*

2 parts of the dyestuff obtained according to Example 2 are dissolved in 100 parts of water.

A cotton fabric is impregnated with this solution on the padder and the excess liquor is squeezed off until the weight of the fabric shows an increase of 75%.

The fabric impregnated in this manner is dried and then impregnated at room temperature with a solution containing per liter 10 grams of sodium hydroxide and 300 grams of sodium chloride, squeezed to a weight increase of 75% and steamed for 60 seconds at 100 to 101° C. The fabric is then rinsed, treated in a sodium bicarbonate solution of 0.5% strength, rinsed, soaped for 15 minutes in a boiling 0.3% solution of a non-ionic detergent, rinsed and dried.

A bluish red dyeing fast to boiling is obtained. When a spun rayon fabric is dyed instead of a cotton fabric, a similarly good result is achieved.

*Example 16*

2 parts of the dyestuff obtained according to Example 4 and 20 parts of urea are dissolved in 80 parts of water, 2 parts of sodium carbonate are added, and this solution is used to impregnate a cotton fabric which is then squeezed to a weight increase of 75% and dried in air.

The fabric is then exposed in a drying cabinet to dry heat of 80° to 90° C. for 1 hour, rinsed, soaped at the boil and dried. A reddish violet dyeing is obtained which is fast to wetting.

*Example 17*

2 parts of dyestuff No. 12 in the table in Example 4 are dissolved by boiling in 100 parts of water. The resulting stock solution is added to 2900 parts of water at 20° C. 30 parts of trisodium phosphate and 60 parts of sodium chloride are added, 100 parts of cotton are immersed, the temperature is raised to 80° C. within 45 minutes, another 60 parts of sodium chloride are added and dyeing is continued for 30 minutes at 90 to 95° C. The dying is then rinsed and after-treated for 15 minutes in a boiling solution containing per liter of water 2 grams of sodium carbonate and 3 grams of soap. The fabric is once more rinsed in cold water and then dried.

A red dyeing of very good fastness to washing and light is obtained.

*Example 18*

2 parts of the dyestuff obtained as described in Example 1 are dissolved in 4000 parts of water, 10 parts of crystalline sodium sulfate are added, and 100 parts of well-wetted wool are immersed in the resulting dyebath at 40 to 50° C. 2 parts of acetic acid of 40% strength are then added, the temperature is raised to the boil within ½ hour and the material is dyed at the boil for 45 minutes. The wool is finally rinsed in cold water and dried. The wool is dyed greenish yellow tints fast to washing and of good fastness to light.

Example 19

2 parts of dyestuff No. 4 in the table in Example 11 are mixed with 20 parts of urea, dissolved in 28 parts of water and stirred into 40 parts of sodium alginate thickening of 5% strength, and 10 parts of a 10% sodium carbonate solution are then added.

A cotton fabric is printed with this printing paste on a roller printing machine, dried, and the resulting print is steamed for 8 minutes at 100° C. in saturated steam. The printed fabric is then thoroughly rinsed in cold and hot water and dried.

Example 20

2 parts of the dyestuff according to Example 2 are mixed with 4 parts of urea and dissolved in 100 parts of water with the addition of 2 parts of sodium carbonate. A cotton fabric is impregnated with this solution and then squeezed to a weight increase of 75%, dried, steamed for 3 minutes at 100° C., rinsed, soaped in a boiling solution containing per liter 3 parts of a non-ionic detergent, rinsed and dried. A bluish red dyeing is obtained which is very fast to light and washing.

What is claimed is:

1. A watersoluble organic dyestuff selected from the group consisting of the phthalocyanine, anthraquinone, disazo and monoazo dyestuffs, which contains one to four sulfonic acid groups and which has the formula

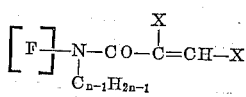

wherein F is the organic dyestuff molecule selected from the group consisting of the phthalocyanine, anthraquinone, disazo and monoazo dyestuffs and is bound to the nitrogen atom through an aromatic nucleus, and wherein $n$ is a whole number from 1 to 3 inclusive, one X represents a hydrogen atom and the other X a member selected from the group consisting of a hydrogen and a chlorine atom.

2. The anthraquinone dyestuffs according to claim 1, wherein $n$ is 1.

3. The azo dyestuffs according to claim 1, wherein $n$ is 1.

4. The monoazo dyestuffs according to claim 1, wherein $n$ is 1.

5. An anthraquinone dyestuff of the formula

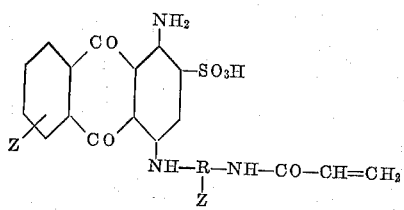

wherein R represents a monocyclic benzene radical, one Z a sulfonic acid group and the other a member selected from the group consisting of a sulfonic acid group and a hydrogen atom.

6. A monoazo dyestuff which in its free acid state corresponds to the formula

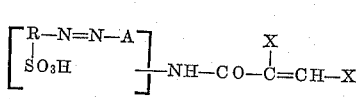

wherein R represents a monocyclic benzene radical, A the radical of coupling component containing a sulfonic acid group, one X a hydrogen atom and the other X a member selected from the group consisting of a hydrogen and a chlorine atom.

7. A monoazo dyestuff which in its free acid state corresponds to the formula

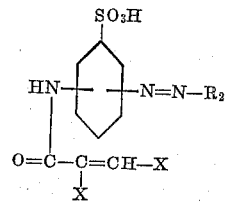

wherein $R_2$ represents a member selected from the group consisting of a 5-pyrazolone bound to the azo linkage in 4-position and having in 3-position a methyl group, and a naphthalene radical bearing at least one sulfonic acid group and in vicinal position to the azo linkage a hydroxyl group, one X represents a hydrogen atom and the other X a member selected from the group consisting of a hydrogen and a chlorine atom.

8. A monoazo dyestuff which in its free acid state corresponds to the formula

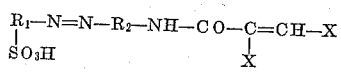

wherein $R_1$ represents a benzene radical, $R_2$ represents the radical of a hydroxynaphthalene sulfonic acid, one X a hydrogen atom and the other X a member selected from the group consisting of a hydrogen and a chlorine atom.

9. The monoazo dyestuff which in its free acid state corresponds to the formula

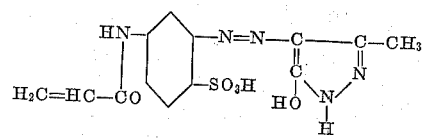

10. The monoazo dyestuff which in its free acid state corresponds to the formula

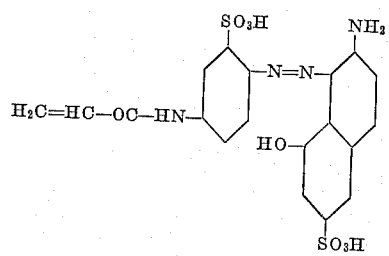

11. The monoazo dyestuff which in its free acid state corresponds to the formula

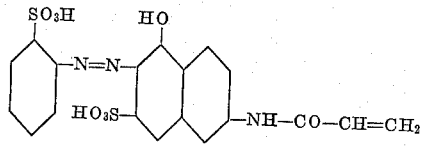

12. The monoazo dyestuff which in its free acid state corresponds to the formula

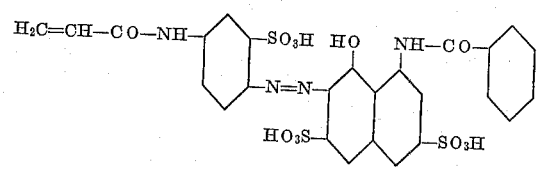

13. The monoazo dyestuff which in its free acid state corresponds to the formula

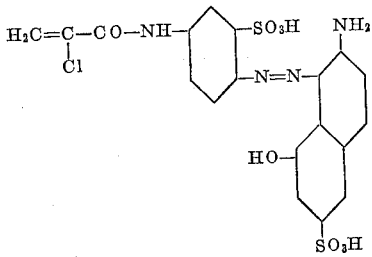

14. The monoazo dyestuff which in its free acid state corresponds to the formula

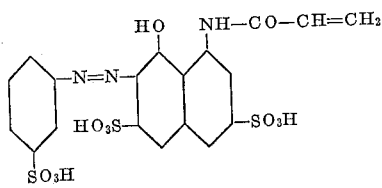

15. The anthraquinone dyestuff which in its free acid state corresponds to the formula

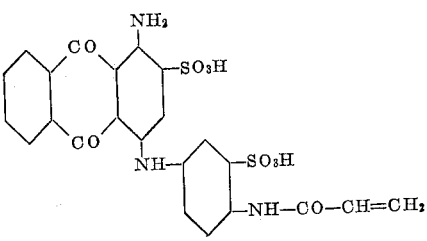

16. The monoazo dyestuff which in its free state corresponds to the formula

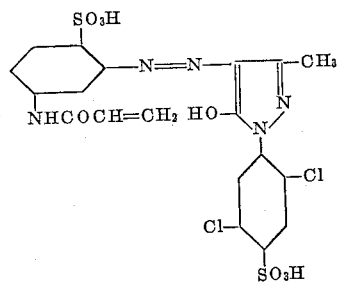

17. An anthraquinone dyestuff of the following formula:

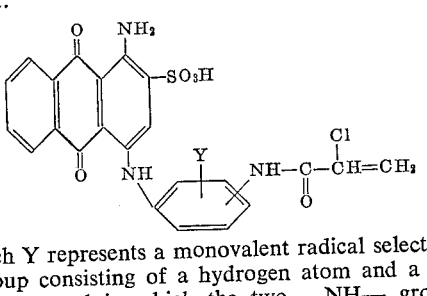

in which Y represents a monovalent radical selected from the group consisting of a hydrogen atom and a sulfonic acid group and in which the two —NH— groups are situated with respect to one another in one of the positions meta and para.

References Cited by the Examiner
UNITED STATES PATENTS

| | | | |
|---|---|---|---|
| 2,128,255 | 8/1938 | Krzikalla et al. | 260—151 X |
| 2,657,205 | 10/1953 | Heyna et al. | 260—163 X |
| 2,743,267 | 4/1956 | Heyna et al. | 260—163 X |
| 3,098,063 | 7/1963 | Eisele et al. | 260—163 |

CHARLES R. PARKER, *Primary Examiner.*

D. M. PAPUGA, *Assistant Examiner.*